United States Patent
Coutandin et al.

(10) Patent No.: US 7,044,845 B2
(45) Date of Patent: May 16, 2006

(54) CASING FOR INDIVIDUALLY PACKED PRODUCTS

(75) Inventors: Jochen Coutandin, Langenlonsheim (DE); Theo Krams, Kiedrich (DE); Thomas Kummer, Taunusstein (DE); Hans Lage, Walluf (DE); Bernd-Adolf Schäfer, Hambuehren (DE)

(73) Assignee: Kalle Nalo GmbH & Co KG (DE)

( * ) Notice: Subject to any disclaimer, the term of this patent is extended or adjusted under 35 U.S.C. 154(b) by 1036 days.

(21) Appl. No.: 09/768,822

(22) Filed: Jan. 25, 2001

(65) Prior Publication Data

US 2001/0018085 A1 Aug. 30, 2001

(30) Foreign Application Priority Data

Jan. 29, 2000 (DE) .......................................... 100 03 886

(51) Int. Cl.
A22C 11/00 (2006.01)

(52) U.S. Cl. ........................................................ 452/30
(58) Field of Classification Search ................... 452/30, 452/21, 35
See application file for complete search history.

(56) References Cited

U.S. PATENT DOCUMENTS

| | | | |
|---|---|---|---|
| 3,064,803 A | * | 11/1962 | Eichin et al. ................ 206/499 |
| 3,657,769 A | * | 4/1972 | Martinek ....................... 452/30 |
| 4,162,693 A | * | 7/1979 | Beckman ................... 138/118.1 |
| 4,867,204 A | * | 9/1989 | Ellis et al. ................ 138/118.1 |
| 5,045,020 A | * | 9/1991 | Neeff et al. .............. 138/118.1 |
| 5,215,495 A | | 6/1993 | Crevasse |
| 5,399,399 A | * | 3/1995 | Benik et al. .............. 138/118.1 |
| 5,888,130 A | | 3/1999 | Weinheimer et al. |

\* cited by examiner

*Primary Examiner*—Robert P. Swiatek
*Assistant Examiner*—Judith Nelson
(74) *Attorney, Agent, or Firm*—Connolly Bove Lodge & Hutz LLP

(57) ABSTRACT

A tubular casing that is capable of receiving a product therein in an outstretched state, said casing comprising:
- a pleated accordion shaped envelope section;
- a front-end section on the opposite end from the pleated accordion shaped envelope section, the front-end section being tucked back at a central portion thereof across the longitudinal direction of the casing, the front-end section being stretched and crimped lengthwise with respect to the length of the casing;
- a middle section that is adjacent to and between the front-end section and the accordion shaped section, wherein the middle section is crimped lengthwise with respect to the length of the casing;
- wherein the middle section and the front end section are tied off, and the casing has a fluid moisture content of 18 to 35 wt.-% based on the total weight of the casing.

15 Claims, 3 Drawing Sheets

PRIOR ART

CASING FOR INDIVIDUALLY PACKED PRODUCTS

BACKGROUND OF THE INVENTION

1. Field of the Invention

The present invention relates to casings suitable for containing products that are to be packed individually, and more particularly to casings that comprise a tube ruffled to form the shape of a "caterpillar" or an accordion. The present invention further relates to methods for preparing casings as well as to their use in food and other products.

2. Description of Related Art

Casings are generally disclosed in EP-B 0 799 571 ["EP '571"]. The casings described in EP '571 are packed and transported in a special container that is designed as a transport and moistening container with a water inlet and outlet. The casings are wetted in the container at the client's premises before they are filled in order to provide the casings with the flexibility needed for the filling process.

In the field of ruffled, unstuffed casings, small caliber sausage casings (i.e., those with a diameter of less than about 85 mm) are generally known. Such casings are used for many types of products such as smoked sausage. In conventional processes for stuffing such casings, it is possible to employ known types of stuffing machines. The stretched, flat casings, which are bound off at one end, and generally have a length of 100 to 180 cm, for example. When such casings are stuffed, they are first softened in water to render them pliable. The softened casings are then drawn or fitted by hand onto a filling spout and ruffled. As such, the operator must invariably perform repetitive ruffling motions by hand, which is very tiring. Casings having lengths of more than about 1.80 meters are generally completely shapeless and formless. As such, it is difficult if not impossible to draw such long casings onto the stuffing spout in the time allotted by the machine's operating cycle. The result is that the casing will clutch the filling spout tightly, such that it cannot be ruffled manually.

DE-A 43 14 949 discloses a ruffled casing for single products, which is compactly packaged, so that ruffling the casing prior to stuffing it is not needed. The ruffled casing is compactly packaged and can be held in the hand of the person operating a stuffing machine and drawn onto the spout without the need to manually ruffle the casing by hand. Before ruffling, the casing has a length of 1.02 to 1.52 meters and is not longer than about 1.78 meters.

In another known process, which is also mentioned in DE-A 43 14 949 and which refers to Section III of the publication, "*Sausage Casing Technology*," edited by Indel Karmas and published by Noyes Data Corporation, New Jersey (1974), great lengths of casing are ruffled in caterpillar-like (or accordion-like) strands or ropes. The ruffled strands contain about 20 meters of casing-that has been ruffled or collapsed to a length of about 35 to 44 centimeters. The strand is wrapped in a mesh that prevents it from becoming unruffled. The inclusion of the mesh makes it possible for the casing to be softened in water in a ruffled condition so as to attain flexibility and elasticity. After softening, the wrapping is removed and the casing is drawn onto the stuffing spout. In comparison to single casings, the inclusion of strands generally requires the use of a more complicated or complex machine, since when ruffled strands of casing are employed, the casing must be double-clasped, cut and laid in loops, and also as filled with sausage or other product. Since the strand has a far greater length than usual, twenty (20) to fifty (50) sausages can be made from one strand with a machine such as that disclosed in the above-mentioned publication.

In the process described above, manual ruffling of the casing is not required. However, processes employing long ruffled strands can also be disadvantageous, for example, because the stuffing spout for long strands must have a smaller diameter than the that required for stuffing spouts used with single casings. For example, when preparing casings for a sausage with a diameter of 50 mm from long strands, a stuffing spout with a diameter of 28 millimeters or less and a length from 600 to 1000 mm can be used; in comparison, a thicker stuffing spout with a diameter of 36 mm and a length of 500 mm, for example, can be used to prepare individual casings having the same diameter (50 mm). To compress very long casing material to a length capable of being handled by the stuffing machine, a ruffling mandrel of a small diameter must generally be used. Problems associated with using casings having small inner diameters are intensified when the strands are softened in water before stuffing. While it is softening, the strand swells, resulting in a further narrowing of its inner diameter such that an even smaller stuffing spout is necessary. The use of a longer stuffing spout with a smaller diameter results in a slower throughput, increased smearing of fat and poorer particle determination.

Since nowadays casings are generally composted after they are used, an effort is often made to enable casings with a length greater than 1.50 meters to be ruffled without additional mesh material, since the material used for the mesh is generally not very compostable or degradable.

With respect to the casings disclosed in EP-B 0 799 571, it remains the prevailing opinion that when casings are wetted before they are tied off, it is impossible to achieve perfect pleating or to achieve secure and lasting closure of the end of the casing. Furthermore, casings such as those of EP '571 must be soaked for a long time before they are ready for stuffing, and a large unit is required to contain the packing case and the soaking tank during transportation.

SUMMARY OF THE INVENTION

The present invention is therefore directed to the problem of creating a casing of a large length that can be delivered to the customer ready for stuffing, and can be immediately stuffed with the product.

In accordance with these and other objects, this problem is solved by the present invention since the casing is moistened inside and/or outside with a fluid, up to a moisture content of 12 to 35 wt.-%.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

The invention is further explained below in conjunction with the drawings, wherein.

DETAILED DESCRIPTION OF A PREFERRED EMBODIMENT

Figure 1:
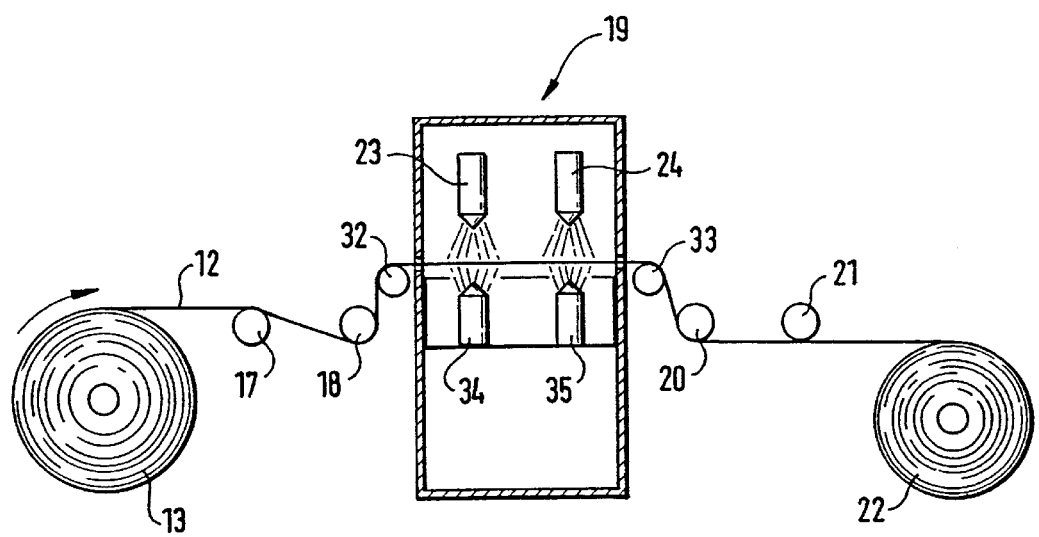
FIG. 1 is a schematic view of a spray winder for moistening a strand of casings before it is ruffled to form pleated casings.

In accordance with the present invention, a front end of the tube is rolled back on itself at the center of a given section across the tube length, and the rolled-back section and a drawn-out portion of the casing are pleated and tied shut. The present invention in one embodiment is directed to a casing 1, consisting of a ruffled envelope which has the shape of a caterpillar 11, a product being able to be filled into the envelope in the outstretched state, the casing has a given section 2d at a front end 3, the section 2d is tucked back in its center across the longitudinal direction of the casing, a portion 2 of the casing is stretched and crimped, the section 2d is crimped, the pleated portion of the casing and the crimped section 2d are tied off, and the casing is moistened inside and/or outside with a fluid up to a moisture of 12 to 25 wt.-%.

In a further embodiment of the invention, the moisture is the fluid content of the casing expressed as a percentage of the total weight of the moistened casing. Advantageously, the final moisture content ranges from about 18 to about 35 wt.-%, more particularly from 23 to 29 wt.-%, in both cases based on the total weight of the moistened casing. In addition, the final moisture content can be reached in two steps, in which the moisture of the casing prior to ruffling ranges from about 12 to about 25 wt.-%, more particularly from 13 to 19 wt.-%, and before the casing is ruffled this moisture is preferably increased to the final moisture content of 18 to 35 wt.-%.

In embodying the invention, the liquid consists of water that has been treated with additives. Any known additives can be employed. One suitable additive is at least a fungicide that prevents the formation of mold during the storage and transportation of the moistened casing. The fungicide can be advantageously selected from the group of the isothiazolone and benzimidazole compounds, salts of sorbic acid, glycerin monolaurate, and di-n-decyldimethylammonium compounds. Other suitable additives include plasticizers such as propanediol and glycerin for the casing material. The moistened casing is advantageously packed in a sealed plastic bag serving to block water vapor.

In another embodiment of the instant invention, the casing can be preferably tied off at an edge of the "cuffed" pleated section of the moistened casing. In yet a further embodiment of the invention, two moistened, pleated equal lengths of the front end lie one on the other. In another embodiment of the invention, the pleats of the moistened casing are cup-shaped or dish-shaped, each pleat being bent inward and having a height of up to 20 mm, and the pleats are combined together to form a "caterpillar" or accordion shape. Advantageously, the section of casing adjacent the front end of the moistened casing can be shaped in the form of a cup with a curved bottom that reaches into the interior of the caterpillar.

In accordance with the present invention, an advantage is achieved in that a casing for a single product of a substantially large length of, e.g., 1.50 to 3.50 meters, has an inner diameter that is only slightly greater than the diameter of the stuffing spout (also known as a "stuffing horn"), so that rapid stuffing of the casing at a stuffing pressure ranging from about 0.6 to about 0.8 bar, for example, can be achieved without the occurrence of fat smears or without bursting the tied-off end of the casing. A further advantage of the present invention is that the moistened caterpillar-shaped or accordion-shaped casing has adequate stability despite its high moisture content of from about 12% to about 25% based on the weight of the moistened casing.

In FIG. 1 a suitable apparatus is shown schematically for spraying an unruffled strand 12 of casing. The flattened strand 12 of casing is unwound from a supply roll 13 and introduced over rollers 17, 18 and 32 into a so-called spray winder 19 and transported therethrough. In the housing of the spray winder 19, spraying devices 23, 24 and 34, 35, are situated above and below the web of the strand 12, and from the spraying devices, moistening fluid is sprayed onto the exterior of the casing strand 12.

The moistening fluid can be any known fluid, and is preferably water, that may optionally further contain one or more fungicides and/or softeners, as well as other components typically used in similar products such as flavorings and the like. The fungicide or fungicides employed can any known, and are advantageously chosen from the group of the isothiazolone compounds, benzimidazole compounds, salts of sorbic acid, glycerin monolaurate, and di-n-decyldimethylammonium compounds. These are fungicides known in themselves, as described in detail, for example, in the applicant's EP-B 0 141 066, 0 330 996 and 0 378 069, all of which are incorporated herein by reference in their entireties. Any known softener can be added if desired. Examples of suitable known softeners that can be added to the water for the casing material include propanediol and glycerine.

After leaving the spray winder 19, the externally sprayed casing strand 12 is delivered by rollers 33, 20 and 21 to a supply roll 22 and wound onto the supply roll 22. Thereafter the moistened casing strand can be further worked, ruffled to form pleated casings and cut into short sections as desired.

In the spray winder 19, the casing strand 12 is externally moistened preferably to a moisture content of preferably about 12 to 35 wt.-%, more preferably from 23 to 29 wt.-%. The moisture is the fluid content of the casing strand 12 in percentage by weight of the total weight of the moistened casing strand 12. Of course the same moisture content of 12–35% by weight is also present in the casing itself, i.e., in the ruffled casing 1. The final moisture content preferably ranges from about 18 to about 35 wt.-%, which can be achieved, for example, by a single spraying of the unruffled casing strand 12 in the spray winder 19.

The moistening of the casing strand 12 can also be done in two steps if desired, by (1) adjusting the unruffled strand 12 in the spray winder to an external moisture content of preferably 12 to 25 wt.-%, more particularly 15 to 19 wt.-%, and then, (2) immediately before ruffling, spraying both the inside and the outside of the casing strand with liquid until the end moisture of about 18 to about 35 wt.-% (or exactly 18–35%) is reached.

Figure 2:
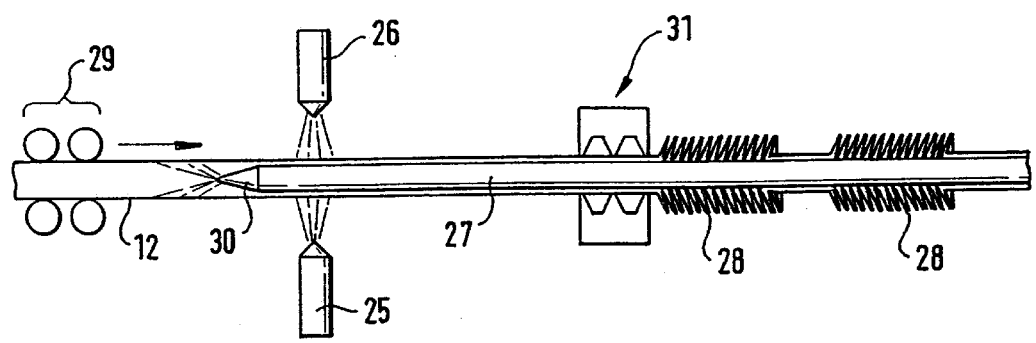
FIG. 2 is a schematic section through a ruffling mandrel and the spraying of the strand with fluid inside and out.

The spraying of the strand 12 immediately before ruffling to form the pleated casing 1 is explained, for example, in FIG. 2. The casing strand 12 is pushed by a feeding station 29 onto a ruffling mandrel 27 at whose tip the moistening fluid is sprayed by a nozzle 30 onto the inside of the casing strand 12. The outside of the casing strand 12 is sprayed with the moistening fluid (suitably water plus optionally fungicide and/or softeners) by sprayers 25 and 26. A ruffling station 31 pushes the strand to form a pleated strand, caterpillar or accordion shape, which can then be twisted, pulled apart and/or cut to individual pleated casings. Of course, the final moisture can also be reached by spraying only the inside of the casing strand 12. To reduce friction during the ruffling operation, a small amount of paraffin oil can be sprayed onto the casing before ruffling if desired.

Heretofore, unmoistened pleated casings were packed in a special moistening shipping container and transported to the customer. The customer had to then water the casings after they were received in order to achieve the flexibility needed for the stuffing process. According to the present invention, the pleated casings are already moistened during their production in order to possess a moisture content suitable for processing by the customer (or other user). Thus the following advantages can be achieved by employing the present invention:

Saves time required for wetting the casings

Saves water at the customer's premises

Improves hygiene due to reduced danger of contamination by bacteria, mold etc.

Smaller packing cases than the water tanks and packing formerly used.

Greater flexibility of client's production due to smaller packing units.

Figure 3:
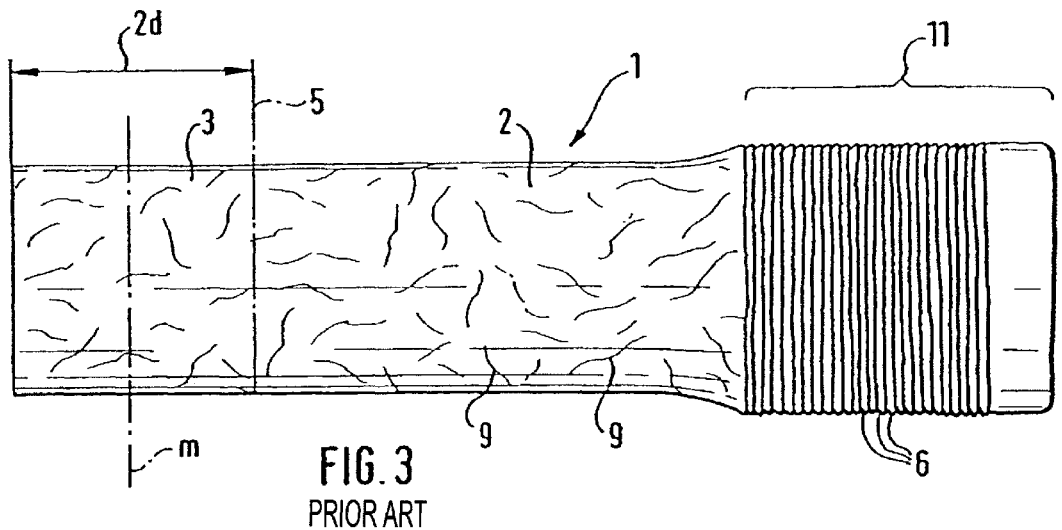
FIG. 3 is a schematic side view of one end and of a partially drawn-out portion of a pleated casing.

In FIG. 3, there is shown a schematic side view of a portion of a moistened and pleated casing 1 having a suitable shape and configuration according to the present invention. On the right side of the drawing the casing 1 is collapsed to create a caterpillar or accordion shape 11, from which a drawn-out portion 2 extends leftward to merge in a front end 3. The caterpillar 11 generally comprises interleaved cup-shaped folds 6. The end 3 has two sections of length d, and is divided by an axis m transversely across the length of the casing 1 into two halves. Portion 2 and end 3 have wrinkles 9 which develop because the end 3 and portion 2 of the casing 1 are first collapsed into the caterpillar 11 and drawn out of it for the pleating and tying of the front end 3 of the casing 1. However, portion 2 and end 3 may be smooth, ie., free of wrinkles. The front end 3 of the casing 1 is tucked back across the length of the casing 1 along the axis m, so that two sections of equal length d and d lie one on the other. The length of section d preferably amounts to at least 2 centimeters. The two superimposed lengths d and portion 2 are then crimped (i.e., frilled) lengthwise of the casing 1, as shown schematically in FIG. 4. The tucked-back end 3 is tied off along its edge 5. This is accomplished, for example, by employing a string or cord 4 against the edge 5 of the tucked-back and crimped end 3.

Figure 4:
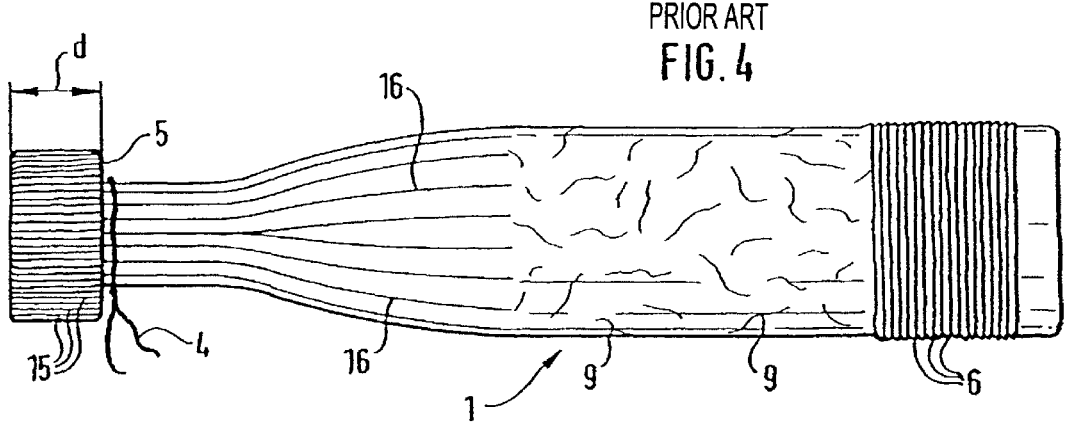
FIG. 4 shows a wrapped end of the casing of FIG. 3, in a pleated state and which is tied off.

The tie-off 4 in FIG. 4 can be performed with or without a loop, depending on whether the filled casing 1 is to be hung or is to be carried and stored horizontally. The tie-off 4 is generally situated ahead of the tucked-back and crimped end 3 and serves as a shut-off during the stuffing of the casing 1. This is because the tie 4 is in contact with the edge 5 on the tucked-back end 3 and is forced against the end 3 by the stuffing pressure inside of the casing 1. Note, however, that the stuffing cannot be forced beyond the end 3. The tie-off 4 should typically permit a stuffing pressure of 0.6 to 0.8 bar while the casing 1 is being filled, without bursting it or opening up the front end 3. In FIG. 4, it can be seen that the crimping with the creases 16 extends through the end 3 to portion 2. The creases 16 (like the creases 15 on the tucked-back end 3) are perpendicular to the plane of drawing. The end 3 is tucked back on a combined ruffling/tying-off machine and tied off with the binding 4. The crimps 15 and 16 can also be created by employing a combination ruffling/tying-off machine (a manufacturer is Eichel GmbH, Germany).

Figure 5:
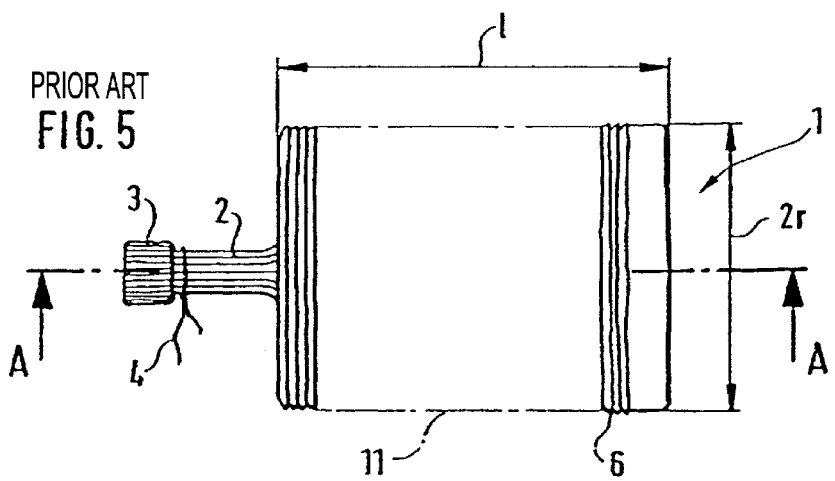
FIG. 5 is a side view with the pleated end drawn onto the caterpillar of the casing.

FIG. 5 depicts an exemplary casing 1 having a constricted and tucked-in portion 2. The portion 2, which is outstretched in FIG. 3, has been tucked back into the interior of the casing 11 to such an extent that only the tied-off end 3 and a small section of portion 2 are outside of the caterpillar 11. The outside diameter 2r of the caterpillar can advantageously be, for example, 80 to 100 millimeters, while length l of the caterpillar 11 can suitable range from about 80 to 90 millimeters. The inside diameter of caterpillar 11 is preferably 60 to 75 millimeters. In the case of an inner diameter of, for example, 70 millimeters in the caterpillar 11, the ruffling of the casing I and caterpillar 11 can be performed on a ruffling mandrel with a diameter, for example, of 73 millimeters. For stuffing a casing thus ruffled, a stuffing spout with an inside diameter of, for example, 60 millimeters can be used. The pleat density, given by the ratio of the length of the unpleated casing l to the length of the caterpillar section of the casing 11, generally ranges from 30 to 40.

Figure 6:
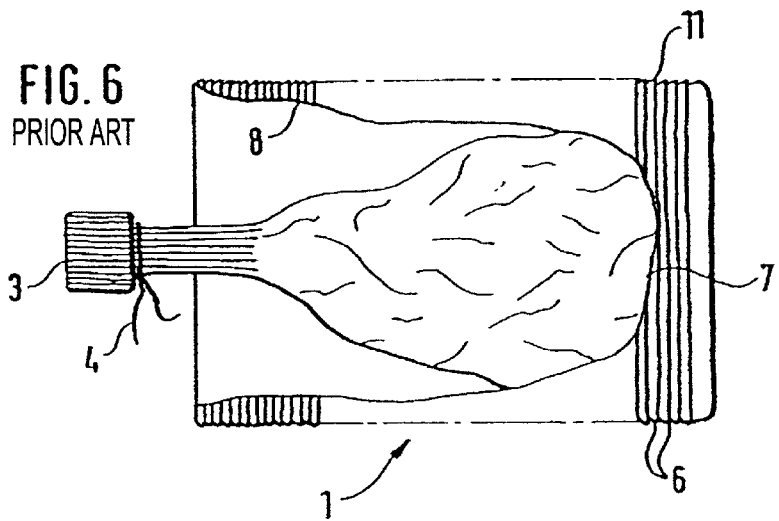
FIG. 6 is a section taken along line A—A of FIG. 5.

FIG. 6 shows a section taken along line A—A of FIG. 5. The pleats 6 of the caterpillar 11 are cup-shaped or dish-shaped, the individual pleats having a height of about up to 20 millimeters. The pleats are tucked inside of one another to form the caterpillar or accordion shape 11. The pleats 6 extending over the circumference of the caterpillar 11 are bent inward, i.e., concavely curved inward above the height of the circumference. The portion 2 adjoining the front end 3 of the casing 1 is tucked back into the interior of the caterpillar 11 and has the shape of a cup 8 with a rounded bottom 7, the cup reaching inside of the caterpillar 11. Preferably only the tied-off end 3 and the tie 4 protrude from the caterpillar 11.

To ship the caterpillar 11, the end 3 cam be pushed still further into the caterpillar to save space. The casing 1 is ruffled to form a modified caterpillar 11 as shown, for example, in FIGS. 5 and 6 and is substantially ready to be filled on a stuffing machine. The significant pleating density of the caterpillar 11 and the height of up to 20 millimeters of the individual pleats provide for great stability of shape of the casing 11. Despite the moistening and elongation of the casing material, the shape is substantially preserved.

Figure 7:
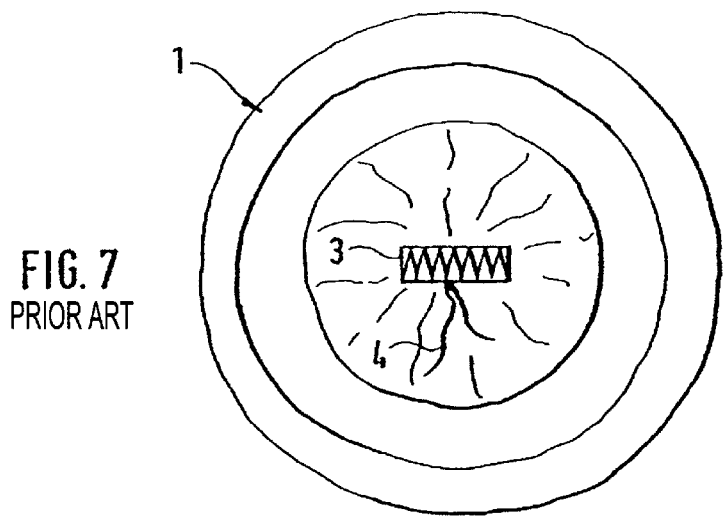
FIG. 7 is a front-end view of the casing.
Figure 8:
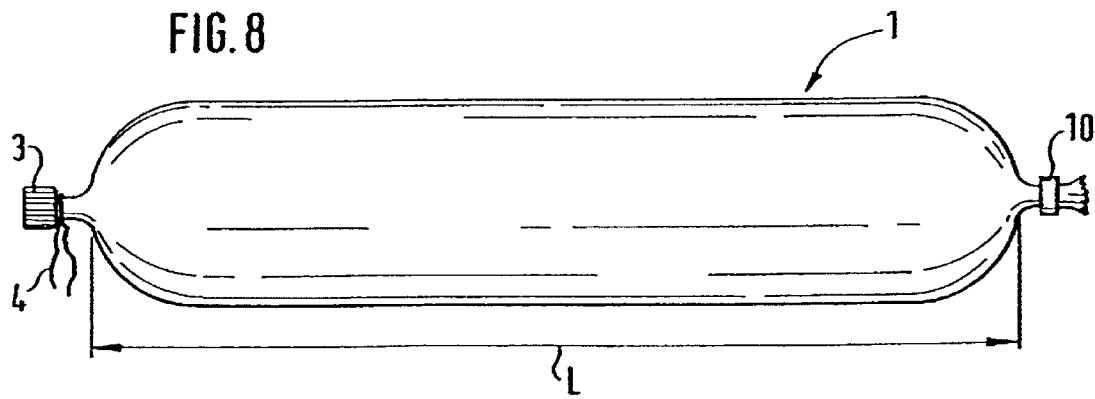
FIG. 8 shows a stretched and filled casing.

An end view is shown in FIG. 7. The casing 1, seen in the direction of the tied-off end 3 shows the pleating and the binding off 4 of the end 3. In FIG. 8, there is shown schematically a casing 1 of the length L fully packed with a product such as sausage meat, for example. The front end 3, tucked back and crimped, is closed with a string or cord as the binding 4. The back end is closed by a clasp 10 of metal or plastic, which is applied on a stuffing machine in a known manner after the completion of the stuffing process. The length of the unruffled casing 1 and of the stuffed casing 1, as it is shown in FIG. 8, preferably ranges from 1.5 to 3.5 meters and is especially equal to or greater than about 1.8 meters, and more preferably equal to 1.8 meters. As mentioned previously, the casing 1 is filled with sausage meat and is smoked and dried in the tied-off state. As soon as the sausage meat is dried, the casing 1 is pulled off and then recycled or composted.

The casing 1, as it is shown in FIG. 8, can preferably have a diameter, for example, of 85 to 90 millimeters, at the start of the stuffing process and can be stretched by the wetting to such an extent that, at the end of the stuffing process the diameter can amount to 105 to 110 millimeters.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined bye the appended claims and their equivalents.

As used herein, articles such as "the", "a", "an" and the like can connote the singular or plural of the object that follows.

The Priority Document, German Application No. 100 03 886.7, filed Jan. 29, 2000 is incorporated herein by reference in its entirety including the title, specification, abstract, claims and figures.

All documents referred to herein are specifically incorporated by reference in their entireties.

We claim:

1. A tubular casing that is capable of receiving a product therein in an outstretched state, said casing comprising:
    a pleated accordion shaped envelope section;
    a front end section on the opposite end from said pleated accordion shaped envelope section, said front end section being tucked back at a central portion thereof across the longitudinal direction of the casing, said front end section being stretched and crimped lengthwise with respect to the length of the casing;
    wherein the middle section and the front end section are tied off, and the casing has a fluid moisture content of 18 to 35 wt.-% based on the total weight of the moistened casing,
    wherein the moisture content is imparted to said casing by a fluid comprising water and one or more additives, at least one of which comprises a fungicide to prevent mold formation during storage and/or transport of the casing.

2. A casing according to claim 1, wherein the fungicide is selected from the group consisting of isothiazolone, benzimidazole compounds, salts of sorbic acid, glycerin monolaurate and di-n-decyldimethylammonium compounds.

3. A casing according to claim 1, wherein said additives comprise at least one softener selected from the group consisting of propanediol and glycerin.

4. A casing according to claim 1, wherein the casing is packed in a tightly closed bag made of a plastic, and wherein said bag is a water-vapor blocker.

5. A casing according to claim 1, wherein a tie lies against an edge of the front-end section of the casing.

6. A casing according to claim 1, wherein the front-end section consists of two moistened and crimped section lengths of equal size, which lie one on the other.

7. A casing according to claim 1, wherein pleats of said envelope section are of a dish shape, such that each pleat is curved inwardly, wherein each individual pleat has a height of up to 20 mm, and that the pleats are assembled into one another and formed into an accordion shape.

8. A casing according to claim 1, wherein the front end section of the casing is adjoined by said middle section that is in the shape of a cup with curved bottom, and wherein the cup extends into the interior of the accordion shaped section.

9. A casing according to claim 1, wherein the length of the casing in said outstretched state is in the range of 1.5 m to 3.5 m.

10. A casing according to claim 1, wherein the inside diameter of the accordion envelope is from 60 to 75 mm and the outside diameter is from 80 to 100 mm.

11. A casing according to claim 1, wherein the ratio of the length of the casing in said outstretched state to the length of the accordion shaped section ranges from 30 to 40.

12. A method for preparing a premoistened casing comprising: moistening a casing strand by spray treatment with a fluid comprising water and one or more fungicides and/or softeners, so that said casing strand has an exterior moisture content of 12–35% by weight based on the weight of the casing after said moistening; delivering said moistened casing to a supply roll and winding said casing thereonto; ruffling said casing to form pleats therein, and optionally, cutting said casing into sections.

13. A method according to claim 12, wherein said moistening comprises at least two steps involving both external and internal spray treatment with a fluid comprising water and optionally one or more fungicides and/or softeners.

14. A stuffed sausage product prepared from a casing according to claim 1.

15. A method for preparing a stuffed product comprising: obtaining a casing according to claim 1, mounting said casing on a stuffing horn, filling said casing with a food product, and closing said casing with a clasp.

* * * * *